Figures 1, 2:
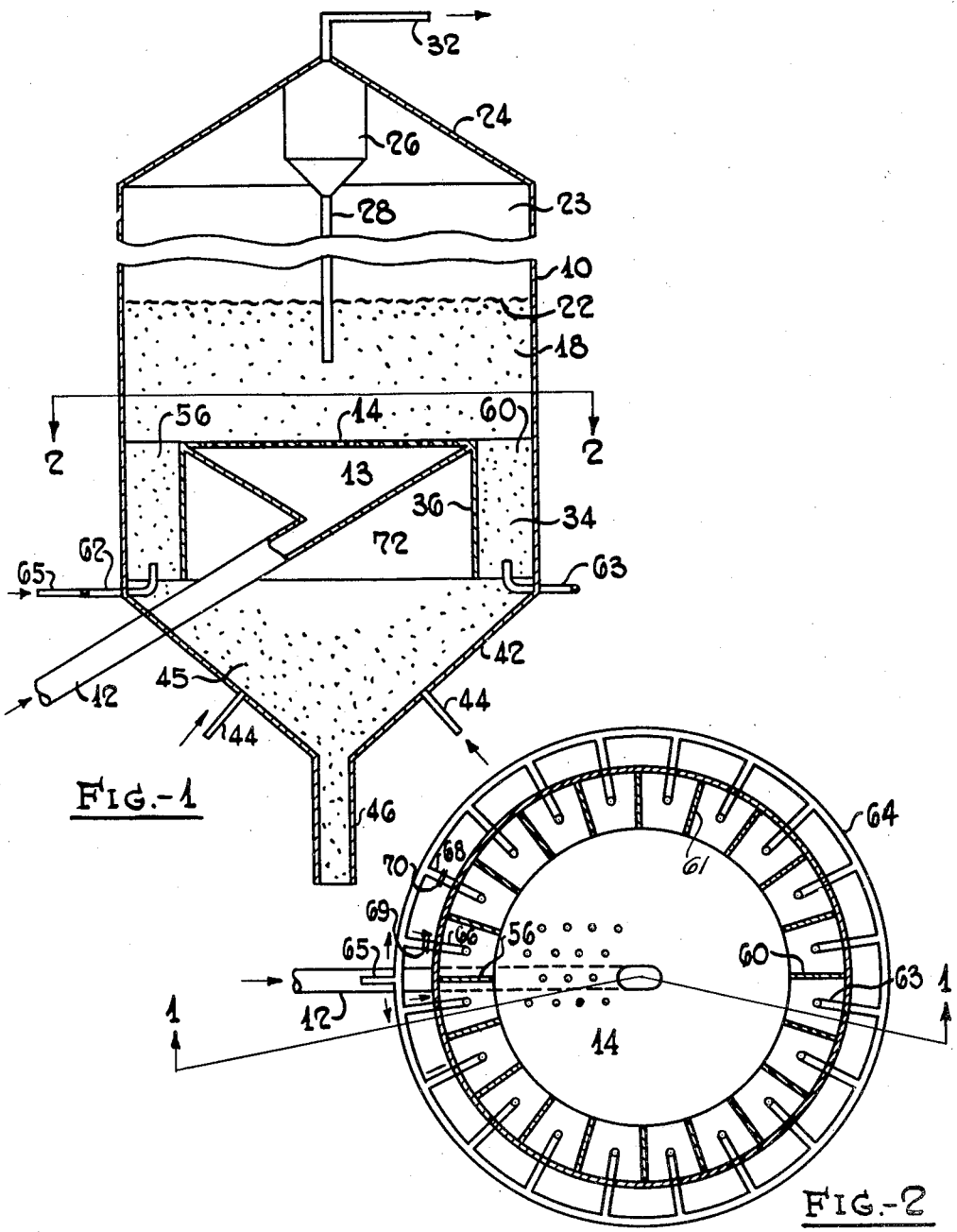

Henry J. Ogorzaly Inventor
By [signature] Young Attorney

Patented Apr. 19, 1949

2,467,850

UNITED STATES PATENT OFFICE 2,467,850

APPARATUS FOR CATALYTIC REACTIONS

Henry J. Ogorzaly, Summit, N. J., assignor to Standard Oil Development Company, a corporation of Delaware Application July 19, 1944, Serial No. 545,669

3 Claims. (Cl. 23—288)

This invention relates to the removal of gaseous or vaporous products from solid catalytic or contact particles in a dense fluidized condition following a chemical reaction or contacting step.

In the catalytic cracking of hydrocarbons it is known that adsorbent catalytic or contact particles in subdivided form become contaminated with coke or carbonaceous deposits which are preferably removed by burning with air or other oxygen-containing gas. Following a cracking operation, hydrocarbon vapors remain admixed with the catalyst or contact particles, and if the hydrocarbon vapors or gases are not removed, these entrained hydrocarbons are burned in the regeneration zone when the catalyst or contact particles are regenerated, thus consuming a portion of the combustion facilities supplied for the primary purpose of burning deposited coke. As a consequence, the capacity of the unit is limited, or additional expenditure is required to increase carbon burning facilities.

In the newer fluid catalyst or contact particle plants or bottom draw-off plants, the solid particles are maintained in a dry dense fluidized liquid-simulating condition in the reaction zone and the spent or contaminated catalyst or contact particles are withdrawn in a dense phase from the bottom of the reaction zone. The withdrawn dense fluidized mixture is passed to a standpipe for developing hydrostatic pressure for delivering the contact or catalyst particles to the regeneration zone. The spent catalyst or contact particles in dense fluidized condition are stripped as they leave the bottom of the reaction zone through an annular stripping or purging section, or through a cylindrical section of relatively large diameter. However, with this form of stripping section, incomplete stripping or purging of entrained vapors has been experienced.

I have found that with other variables, such as the velocity of the stripping gas or the ratio of stripping gas to catalyst flow maintained constant, better stripping or purging is obtained if the ratio of the length to the effective diameter of the stripping zone is large. To improve stripping or purging in units using a large diameter stripping section in the bottom of the reaction zone, I subdivide the stripping section into a plurality of cells or sections separated by vertical partitions or baffles. In this way the ratio of the length to the effective diameter of the stripping section is increased over the ratio used in the stripping section without partitions and better stripping or purging is obtained. With annular shapes of stripping zone, effective diameter is defined in terms familiar to hydraulic engineering as equal to four times the cross-sectional area divided by the wetted perimeter.

While catalytic conversions of hydrocarbons have been above specifically described, it is to be understood that my invention may be used with other reactions in which it is desirable to strip or purge the solid particles before regenerating them or before using them in another reaction.

In the drawing,

Fig. 1 represents a longitudinal cross-section taken substantially on line 1—1 of Fig. 2 through one form of apparatus which may be used in carrying out my invention; and Fig. 2 represents a horizontal cross section taken substantially on line 2—2 of Fig. 1.

Referring now to the drawing, the reference character 10 designates a cylindrical vessel comprising a reaction zone. An inlet 12 is provided through which reactants and subdivided contact particles are introduced into the vessel 10. The inlet line 12 communicates with a conical chamber 13 venting into the reaction zone through a circular perforated distribution plate 14 arranged in the bottom portion of vessel 10 and which functions to evenly distribute the contact particles and reactants across the area of the reaction vessel 10.

In the catalytic conversion of hydrocarbons, either liquid or vaporous hydrocarbons may be mixed with hot regenerated catalyst particles and the mixture passed through line 12 and distribution plate 14 into the vessel 10 or the hydrocarbons and the solid particles may be separately introduced into the vessel 10. In the catalytic cracking of hydrocarbons, the feed stock may comprise crude oil, reduced crude oil, gas oils, and the like. Other catalytic conversions of hydrocarbons are contemplated, such as catalytic reforming, catalytic dehydrogenation and catalytic oxidation; also non-catalytic processing of hydrocarbons, such as coking with an inert heat-adsorbent material, is also within the scope of this type of operation; and many other processes involving the use of catalytic or inert subdivided solids with reactants of different chemical nature from the hydrocarbon series may also be envisioned.

My invention, however, is especially adapted for use in catalytic cracking of hydrocarbons, and the specific form of my invention will be described in connection with such a process. The catalyst particles may be any suitable cracking catalyst such as acid-treated bentonite clays, synthetic silica alumina gels, synthetic silica magnesia gels, etc. Preferably, the catalyst is in powdered form having a size between about 200 and 400 Standard mesh but coarser catalyst particles may be used if desired. During the cracking operation, the temperature in the reaction vessel 10 is between about 850° F. and 1100° F. but different temperatures may be used for other catalytic treatment of hydrocarbons or other reactions.

The velocity of the vapors passing upwardly through the vessel 10 is selected to maintain the catalyst particles in a dry fluidized liquid-simulating mass or mixture 18 having a level indicated at 22. The ratio of catalyst to oil by weight may vary between about 1 to 1 and 40 to 1. The reaction products in vapor form pass upwardly from the dense bed or mixture 18 into the dilute phase 23 in which there is suspended only a small amount of catalyst or contact particles. The upper portion of the vessel 10 is provided with a converging conical top 24.

Located within the top of the vessel 10 is a separating means 26 which is shown in the drawing as a cyclone separator but which may be any suitable separating means. The separating means 26 is used to separate entrained catalyst or contact particles from the vaporous reaction products leaving the dilute phase 23 and passing into the separating means 26. The solid catalyst or contact particles which are separated in the separating means 26 fall to the bottom of the separating means and into a pipe 28 which dips below the level 22 in the vessel 10 and returns the separated particles to the relatively dense mixture 18.

The vaporous reaction products substantially free of catalyst or contact particles pass overhead through line 32 and the desired products are separated from the reaction products. Where catalytic cracking is being carried out the reaction products are preferably passed to a fractionating system for separating gasoline from heavier constituents.

During the catalytic cracking or conversion of hydrocarbons in the reaction zone, the catalyst or contact particles become contaminated with coke or carbonaceous deposits. Before regenerating the contaminated or spent catalyst particles it is important to strip or purge the contaminated or spent catalyst or contact particles to remove hydrocarbon vapors or gases admixed with the contaminated catalyst particles. With such stripping, the load on the regenerator is reduced, and in addition, some of the hydrocarbons are recovered instead of being burned in the regenerator.

The contaminated or spent catalyst or contact particles are withdrawn as a relatively dense mixture from the bottom of the dense fluidized bed or mixture 18 into a stripping zone 34 which is arranged in the vessel 10 below the distribution plate 14. A skirt or apron 36 may be extended downwardly from the distribution plate 14 to form an annular stripping or purging zone between the apron or skirt 36 and the wall of the vessel 10.

From the stripping or purging section 34 the catalyst or contact particles as a relatively dense fluidized liquid-like mixture are passed to the bottom of the vessel 10 which is provided with a funnel-shaped bottom 42. Preferably fluidizing gas is introduced into the bottom 42 of the vessel 10 through line or lines 44 to maintain the catalyst or contact particles in a dense fluidized condition as shown at 45. The stripped or purged catalyst or contact particles are then introduced into a standpipe 46 of which only a portion is shown. The fluidized mass in the standpipe 46, together with the fluidized dense mixture in the reaction vessel 10, provides a head of fluidized solids for developing hydrostatic pressure at the base of the standpipe for passing the contaminated or spent catalyst particles to a regeneration zone (not shown).

In the usual reactors provided with a bottom draw-off for spent or contaminated catalyst particles in dense fluidized condition, the stripping or purging section 34 is in the form of an annular stripping or purging section, or it may be cylindrical in shape. Because of the large quantities of material handled, the cross-sectional area, and hence the effective diameter, is large, and incomplete purging or stripping has been experienced.

According to my invention, annular stripping or purging sections are subdivided into a plurality of cells or sections by spaced vertical baffles which extend from the apron or skirt 36 to the inner wall of the vessel 10 and from the top of the purging or stripping section at about the level of the distribution plate to the bottom of the annular zone. In Fig. 1, I have designated two of the partitions by numerals 56 and 60 and inspection of Fig. 2 will show the location of partitions 56 and 60 in plain view. In addition, I have designated another partition by numeral 61. The cells or sections formed by these partitions may be extended into the reaction zone above the level of the distribution plate 14 and below the bottom of the skirt 36 with additional advantage in completeness of stripping, if desired; if this is done, a wall to separate the extension of the chambers from the reaction zone 18 or the zone 45 must be supplied.

In the construction of commercial fluid cracking catalyst plants using stripping zones of large cross-sectional area without subdivision by vertical baffles, the stripping or purging gas is introduced at a plurality of spaced points more or less evenly distributed throughout the area of the stripping zone by means of perforated distribution rings installed in the bottom part of the stripping zone near the bottom of skirt 36, or through separate injection points inserted at spaced intervals through the conical wall 42 at the bottom of the stripping zone, which constricts the stripping area into the top of the standpipe.

In the present invention, it is desirable to take greater precautions to assure even distribution of stripping or purging gas by employing separate lines for introducing gas into the bottom portion of each of the cells or sections. In Fig. 1, the lines 62 and 63 indicate means for introducing the stripping or purging gas into the cells or sections partly shown therein. Preferably the distribution is from a common manifold 64 shown in Fig. 2, supplied by line 65, from which individual lines such as 62, 63, 66, and 68 supply each of the cells. Even distribution of stripping gas to the individual cells is assured by external restricting orifices, exemplified by 69 and 70 in lines 66 and 68.

It is preferable, as illustrated in Fig. 1, to release the stripping gas vertically at a point centrally located in each chamber at some distance above the bottom of the individual stripping chamber or cell. The latter precaution serves to assure that the gas injected in each cell rises within that chamber, and is not deflected by the downward flowing stream of catalyst with resultant maldistribution of stripping gas. As a further assurance of good gas distribution, it is desirable to provide a serrated bottom on the skirt 36 so that gas rising from the bottom cone 42 and standpipe 46, which collects in the gas cap 72 inside skirt 36, and escapes under skirt 36 into stripping zone 34, is evenly divided among the several stripping chambers.

While my invention has been specifically described in connection with an annular shape of stripping zone, subdivision by vertical partitions into parallel paths of much reduced cross section is equally applicable to cross-sections of any other shape, such as circular or rectangular, and in all cases results in marked improvement in the degree of the removal of entrained vapors.

The density of the mixture during catalytic cracking of hydrocarbons in the dense bed or fluidized mixture 18 is about 15 lbs./cu. ft. to 25 lbs./cu. ft. when the velocity of the vapors passing upwardly through the bed 18 is about 1.4 ft./second to 0.5 ft./second. In the stripping cells or sections the velocity of the stripping or purging gas is about 2.0 ft. to 0.5 ft./second and the density of the mixture undergoing stripping or purging in each of the separate cells or sections may vary between about 10 lbs./cu. ft. to 25 lbs./cu. ft., depending on the gas velocity and the particle size and density of the contact particles. The stripped or purged fluidized mixture flows downward from the stripping or purging sections to the lower part of vessel 10 wherein the stripped or purged catalyst or contact particles are maintained in a dense fluidized condition as above described. The stripping or purging gas preferably comprises steam in cracking operations, although other inert gases or even oxygen-containing gases may be suitable in some processes.

As an example of a typical application in the commercial hydrocarbon cracking units now being used, the reaction vessel 10 has a diameter of about 23 ft. and the inner diameter of the annular stripping section 34 is about 16 ft. The depth of the annular stripping section 34 is about 8 ft. The partitions used for subdividing the annular stripping section into a plurality of stripping sections might have a spacing of 12 in. and might extend over the full length of 8 ft.; the stripping gas might be released at a point about 1 ft. above the bottom of skirt 36.

To further increase the degree of stripping or purging in the individual cells or sections, additional gas-solids contact apparatus may be included in each of the cells or sections. For example, disc and doughnut constrictions, vertical or horizontal bars and angle irons, spherical balls or other type of packing material, all of which have the effect of further subdividing the cross-sectional area used for stripping, may be employed. The use of such fillers is limited only by the necessity of achieving downward flow of catalyst and upward flow of stripping gas through the restrictions introduced.

While the invention has been specifically described in connection with present units for the catalytic conversion of hydrocarbons, it is to be understood that this is by way of illustration only and that various modifications and changes may be made without departing from the spirit of my invention.

I claim:

1. An apparatus of the character described including a vessel, a distribution plate in the lower portion of said vessel and spaced from the inner wall of said vessel, a skirt depending from said distribution plate and forming an annular space with the inner wall of said vessel, a plurality of spaced vertically arranged partitions or baffles extending laterally from the skirt for subdividing said annular space into a plurality of cells, a common gas distributing manifold, individual means connected to said manifold for introducing a gas into the lower portion of each of said cells, said individual means including a restricting orifice external to said vessel, whereby solid subdivided particles in dense fluidized condition in said vessel above said distribution plate pass down through said cells or sections countercurrent to said gas and into the lower part of said vessel below said distribution plate and said cells or sections.

2. In an apparatus adapted for carrying out catalytic conversions of hydrocarbons wherein a vessel is provided with a concentrically arranged feed distribution plate in its lower portion for introducing reactants and the vessel is adapted to hold a dense dry fluidized mixture of contact particles and reactants and an annular stripping section is provided between said feed distribution plate and the inner wall of said vessel and a plurality of means each provided with a restricting orifice external to said vessel are included for introducing stripping gas from a common distribution manifold into the lower portion of said stripping section, the improvement which comprises a plurality of vertically arranged partitions in said stripping section for subdividing it into a plurality of cells whereby improved removal of entrained vapors results when the dense dry fluidized mixture flows down through said stripping section.

3. In an apparatus adapted for carrying out catalytic conversions of hydrocarbons wherein a vessel is provided with a concentrically arranged feed distribution plate in its lower portion for introducing reactants and the vessel is adapted to hold a dense dry fluidized mixture of contact particles and reactants and an annular stripping section is provided between said feed distribution plate and the inner wall of said vessel and a plurality of means each provided with a restricting orifice external to said vessel are included for introducing stripping gas from a common distribution manifold into the lower portion of said stripping section, the improvement which includes means for subdividing said annular stripping section into a plurality of substantially parallel cells whereby improved stripping is obtained.

HENRY J. OGORZALY.

REFERENCES CITED

The following references are of record in the file of this patent:

UNITED STATES PATENTS

| Number | Name | Date |
| --- | --- | --- |
| 1,191,753 | Wegner | July 18, 1916 |
| 1,558,119 | Sherban | Oct. 20, 1925 |
| 2,188,920 | Reece | Feb. 6, 1940 |
| 2,336,017 | Jewell et al. | Dec. 7, 1943 |
| 2,337,684 | Scheineman | Dec. 28, 1943 |
| 2,347,682 | Gunness | May 2, 1944 |
| 2,387,309 | Sweeney | Oct. 23, 1945 |
| 2,394,814 | Snuggs | Feb. 12, 1946 |
| 2,420,049 | Martin | May 6, 1947 |

FOREIGN PATENTS

| Number | Country | Date |
| --- | --- | --- |
| 543,838 | Great Britain | Mar. 16, 1942 |